US006580524B1

(12) United States Patent
Weichmann et al.

(10) Patent No.: US 6,580,524 B1
(45) Date of Patent: Jun. 17, 2003

(54) METHOD FOR PROFILING AND CALIBRATING A DIGITALLY CONTROLLABLE PRINTING MACHINE HAVING A PERMANENT PRINTING PLATE

(75) Inventors: Armin Weichmann, Kissing (DE); Karlheinz Huber, Augsburg (DE); Gregor Enke, Augsburg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/400,815

(22) Filed: Sep. 22, 1999

(30) Foreign Application Priority Data

Sep. 29, 1998 (DE) ........................................ 198 44 495

(51) Int. Cl.[7] ............................................... G06F 15/00

(52) U.S. Cl. ........................ 358/1.9; 358/504; 358/505; 358/518; 382/162; 382/167

(58) Field of Search ................................ 358/504–505, 358/1.9, 518; 382/162, 167

(56) References Cited

U.S. PATENT DOCUMENTS

| | | | | |
|---|---|---|---|---|
| 5,313,291 A | | 5/1994 | Appel et al. | 358/501 |
| 5,612,902 A | | 3/1997 | Stokes | 364/526 |
| 5,859,933 A | | 1/1999 | Sasanuma et al. | 382/275 |
| 6,043,909 A | * | 3/2000 | Holub | 358/504 |

FOREIGN PATENT DOCUMENTS

| | | | |
|---|---|---|---|
| DE | 4328026 A1 | 3/1995 | B41F/33/16 |
| DE | 19533811 A1 | 3/1997 | B41F/33/00 |
| DE | 29516830 U1 | 1/1998 | B41F/33/16 |
| EP | 0 613 292 A1 | 8/1994 | H04N/1/46 |
| EP | 0676285 B1 | 10/1995 | B41F/33/00 |
| EP | 0 881 826 | 5/1998 | H04N/1/60 |
| GB | 2 275 584 | 8/1994 | H04N/1/46 |
| JP | 7-203131 | 4/1995 | H04N/1/032 |
| WO | WO 94/08274 | 4/1994 | G03F/3/08 |
| WO | WO 96/08916 | 3/1996 | H04N/1/60 |

OTHER PUBLICATIONS

Polygraph, "Internationale Empfehlung", Dec. 11, 1997.

* cited by examiner

*Primary Examiner*—Mark Wallerson
*Assistant Examiner*—Twyler Lamb
(74) *Attorney, Agent, or Firm*—Cohen, Pontani, Lieberman & Pavane

(57) ABSTRACT

A method for calibrating a digitally controllable printing machine having a permanent printing plate, for which image data has been created in machine-independent format in a pre-press stage. The image data is prepared for the printing process by a data processing device and is fed in adapted form to the printing machine 1. The data processing device uses a profile which corresponds precisely with the current machine condition, for the final data preparation for printing. The profile can be addressed using the correct color-space conversion for the printing machine (i.e., calibrated). For this purpose, at the time at which the data is prepared for image setting, a machine condition forecast for the time of printing is called up and, from this, together with the knowledge of the operating materials, the machine profile which most closely approaches that for the print job is determined. This profile is then used for the data preparation.

23 Claims, 5 Drawing Sheets

METHOD FOR PROFILING AND CALIBRATING A DIGITALLY CONTROLLABLE PRINTING MACHINE HAVING A PERMANENT PRINTING PLATE

BACKGROUND OF THE INVENTION

1. Field of the Invention

The invention relates printing machines, and more particularly to a method for calibrating the image data to the machine condition of a digitally controllable printing machine.

2. Description of the Related Art

Such a printing machine, as disclosed, for example, by DE 295 16 830 U1, operates in particular in accordance with one of the processes of lithographic offset, gravure printing or flexographic printing. That is, a printing plate is generated once with a subject to be printed in order to produce a large number of copies of this subject from this printing plate. It is quite possible for the printing plate to be erasable and reusable (i.e., to have another subject applied to it after cleaning).

An essential feature of a digitally controllable printing machine, however, is that the image data which is to be applied to the machine are present completely in digital form, and that these are used in a manner targeted to the printing machine for setting the image on the printing plate.

Image setting is preferably carried out within the printing machine, but this is also entirely conceivable in a combination of printing-plate exposer and printing machine, which have an information link.

In order to characterize the printing system in terms of color, a so-called profiling of a printing system is carried out by a test pattern being generated from a known, machine-independent data set and printed. This test pattern normally contains fields whose structure is predefined by the individual printing inks of the output device. Thus, for example, use is made of the 1T8.7/3 color test chart for CMYK devices. Each of the measurement fields has a defined composition made up of the individual colors cyan (C), magenta (M), yellow (Y) and black (K).

Following the output of this color test chart, the color loci of the measurement fields in the color space are measured. From these measured values and the known composition of the measurement fields, the output characteristics of the printing system can be determined and a specific device profile can be drawn up. This profile indicates what color space the printer covers and how the individual color loci in the achievable color space can be reached. The coordinate system used for this is usually a device-independent color system, such as the XYZ color system, the Lab color system or the Lab (94) color system further developed from the Lab color system.

In the data preparation before printing, generally referred to as the pre-press stage, this device profile is then used to carry out a transformation from the operating color space, usually an ROB color space for scanners and monitors, into the printer color space. In this case, the profile of the operating color space is linked with that of the printer.

The conversion from one color space to another is not without its problems, since color spaces do not overlap in some areas, particular when RGB to CMYK conversions are concerned. For this reason, during the conversion additional factors may be specified, which specify the type of conversion more closely.

Overall, this procedure is generally known in the literature as color management (see, for example, EP 0 676 285 B1).

The basic idea of color management is that color originals are defined in the digital pre-press stage, irrespective of the output device and the materials used. If images defined in this way are output via a system calibrated with the effect of color management, it is theoretically, ensured that, the colorimetric appearance of the output is always identical or optimal, totally irrespective of the output process used.

If one refers to the best-known standard, —i.e., the ICC (International Color Consortium) standard—with the ICC device profiles defined therein, the device profile is always unique, under the specified illumination and measurement conditions. However, the manner of conversion into the device profile may be carried out differently. In the case of ICC profiles, for example, four different target intents are provided. The conversion may be carried out with absolute colorimetric intent, relative colorimetric intent, saturation intent and photographic intent. Absolute colorimetric intent means, for example, that the color loci are to be transformed absolutely correctly. Therefore, in theory all color values which occur in the two color spaces are identical. Those which cannot be represented in the CMYK color space must be transformed in accordance with an additional rule, for example by being placed on the boundary of the color space.

An important special case of color-space conversion is the CMYK to CMYK transformation, which converts from one printer color space into another. This is necessary, in particular, for proof purposes (the English technical term proof is to be understood as general color proof-printing methods) or in a pre-separated operating sequence, for example if CMYK data occur on the printer which do not correspond to the current profile.

The problem which is presented by a complex output device, such as a printing machine, that the profiles differ depending on the printing material used, the color used, the screen type and screen ruling used and the neutral structure used. Furthermore, the machine characteristics themselves of course go into the profile.

The parameters which do not depend on the printing machine but on the printing material, the color and the type of data preparation (screen) are referred to below as external parameters.

Even if the machine condition can be assumed to be constant, the combination of the external parameters results in a large number of different profiles.

This large number of profiles has to be kept, for example, in a database, in order then to be selected at the time of conversion. According to the prior art, this selection is made manually or by the selection of a profile in accordance with its name or its number. In addition, there is the problem that the selected profiles do not correspond exactly to the current machine condition, but to the condition in which the printing machine was when the profiling was performed. It is possible that given the same combination of external parameters, different profiles have to be applied on account of different machine conditions.

Strictly speaking, the printing machine must therefore always be put into the condition which it has inherently at the time of profiling. Because of variable environmental conditions, such as temperature and atmospheric humidity, or because of changing machine components, such as the hardness of the rubber blanket or roll imprint widths, the machine condition changes and differs from that desired.

Until now, this problem has been solved by a profile being selected and applied manually or semi-manually, but in particular not in a machine-specific manner.

In this process, use is made of the fact that the printing machine has actuating elements (inking-zone screws, ink ductor speed setting) which influence the machine condition. Therefore, to a limited extent, the machine condition can be equated to the desired condition, that is to say to the condition present at the time of profiling. However, this is costly since it entails machine time and does not produce saleable prints. On the other hand there are printing systems, for example offset printing machines printing by the anilox process which no longer have such actuating elements or no longer have them to a sufficient extent.

Although this problem exists in all printing devices, it occurs more often in printing machines having permanent printing plates, since these printing machines operate highly productively. Therefore, significant machine downtime costs occur when re-profiling has to be carried out. On the other hand, this is because readjustment, which can no longer be handled by means of the machine actuating elements, requires a new printing plate to be created, which likewise costs time and material.

SUMMARY OF THE INVENTION

The present invention is based on the object of providing a method which uses the data processing device for the final data preparation for the printing. Normally, the RIP (Raster Image Processor) automatically uses a profile which corresponds precisely with the current machine condition, that is to say can be addressed using the correct color-space conversion for the printing machine, that is to say can be calibrated.

The idea of the invention can be applied irrespective of the printing process. The invention may be implemented both in wet and dry offset, in direct or indirect gravure printing, in flexographic printing and so on.

Accordingly, the calibration of a digitally controllable printing machine having a permanent printing plate is carried out such that, at the time at which the data is prepared for image setting, a machine condition forecast for the time of printing is called up. The forecast information, together with the knowledge of the operating materials, is used to determine the corresponding printing machine profile which most closely approaches that for the print job. This profile is then used for the data preparation.

In a preferred embodiment, generic data of the printing machine or of the operating materials which relate to the color profile are additionally stored in a profile data pool. This data permits direct, data-based conclusions about the machine condition present at the time of profiling and correction to the current condition. It is therefore possible for a machine profile to include all the relevant data to allow adaptation to the machine condition of an individually addressable printing machine, and to restrict the number of necessary profiles to the extent needed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be explained in more detail below with reference to the drawing, in which.

DETAILED DESCRIPTION OF THE PRESENTLY PREFERRED EMBODIMENTS

Figure 1:
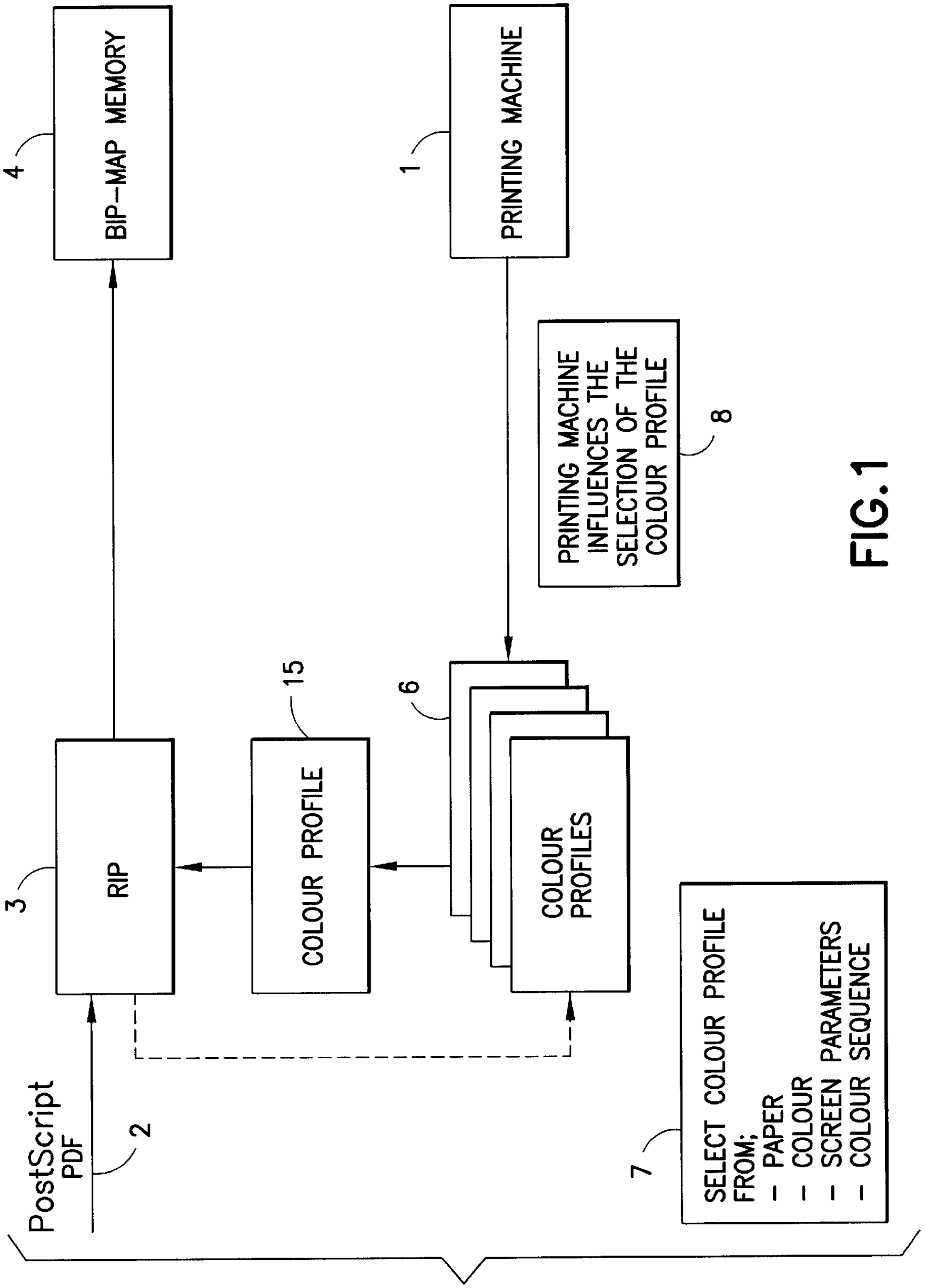
FIG. 1 is a block diagram which illustrates the data flow sequence in general terms.
Figure 4:
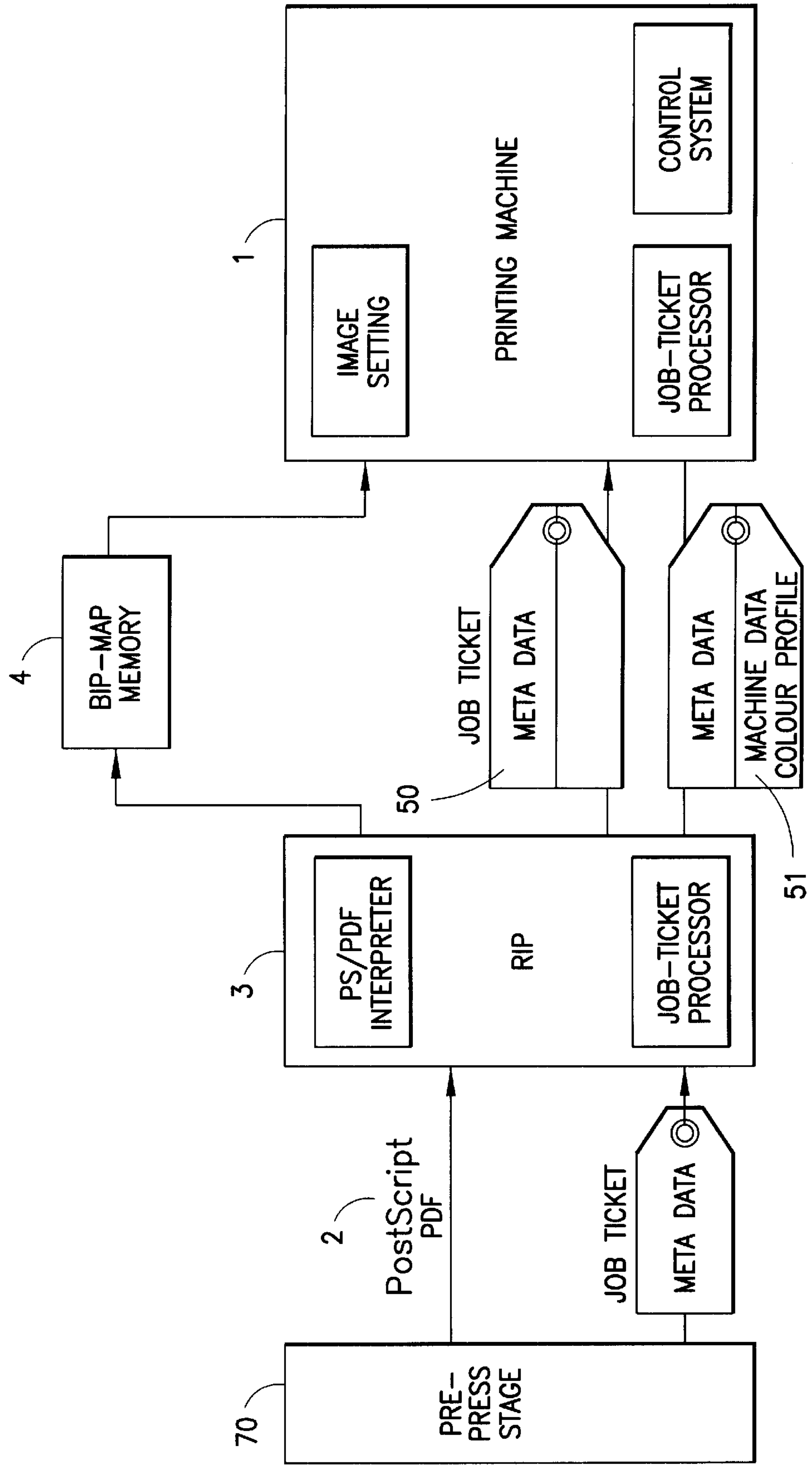
FIG. 4 is a block diagram of a fourth exemplary embodiment, which indicates a further possible data flow sequence with job tickets.

As described previously, a digitally controllable printing machine 1 according to FIG. 1 uses digital image data, which represent the images to be printed and which have been created outside the printing machine in the pre-press stage 70 (FIG. 4) in a machine-independent format, such as in PostScript (PSF) Format 2. The image data is fed to a data processing device, generally an RIP 3, which is assigned to the printing machine 1 and which prepares the image data for the printing process by producing, a digital pixel pattern which is adapted to the printing machine 1 for each color to be printed. Each pixel pattern can be fed, by means of a bit-map memory 4, to the image-setting unit of the printing machine, which then produces a visible printed image pixel by pixel on a substrate.

A number of ink or color profiles 5 are made available in a profile pool 6. These profiles 5 have either already been drawn up by the manufacturer and supplied concomitantly, or have been drawn up by the customer via a predefined profiling procedure.

In order to determine a machine profile, a test form is printed with the desired combination of external parameters 7, the test form is measured and a color profile 5 is drawn up using one of the known color management algorithms which can also be obtained commercially, for example from the Agfa or Logo companies.

In addition, current machine parameters are determined from the measurement fields (e.g. a color test chart such as 1T8.7/3). These are at least the printing characteristic curves 10 (FIG. 3) of the individual colors, which are determined by measuring different area coverages of the individual inks. Printing characteristic curves 10 can be deposited as density characteristic curves or as tonal value gain curves, together with the full-tone density. Furthermore, these may be ink acceptance factors, which have been obtained via the usual measuring methods in the overprinting of two or more colors. If the measurements are carried out spectrally, that is to say a spectrum is recorded for each measurement point, it is possible to use the same data to derive both colorimetric variables, such as color loci, and process engineering variables, such as ink densities.

In one embodiment, in order to permit a comparison with the densitometric measurements which are usual for this, and in particular to also be able to operate with measurements carried out on line in the printing machine, at least the measurement fields which are relevant to the process engineering characteristic levels can also be measured using upstream polarization filters.

This can be preferred spectrally, with it then being possible to at least derive the densitometric variables, or else directly using densitometric measuring heads. Furthermore, the individual spectra of the colors can be stored at the same time in the profile in order to permit densitometric, colorimetric or spectral control.

The calculated color profile is then stored 6 with the process engineering machine parameters 10 determined. Furthermore, it includes the external parameters 7 used, such as paper, color, type of screen and possibly further parameters which are descriptive of the process and machine, such as color sequence, atmospheric humidity, and temperature. In offset, the parameters can include roll impression widths, that is to say roll pressure settings, and type of rubber blankets used. Ideally, all the profiles are recorded with the same machine condition. If this is not the case, they are converted to a desired machine condition in order to be comparable with one another. This can be carried out, for example, by means of an expert system, as has already been described in the earlier German Patent Application P 198 22 662.4-27. Conversion is preferably carried out by adapting the tonal value gain (i.e., the printing characteristic curve in the color profile).

In an advantageous development, in order to improve the comparability of different external parameter combinations, the characteristics of the external parameters are stored in addition to identifying them by name. The paper is characterized beyond the normal classification by, for example, opacity, roughness, absorption behavior, thickness, grammage and filler content. In addition to the normal classification, such as Euroskala Heatset, the ink is characterized by color spectrum, color locus, viscosity, tack and damping solution acceptance behavior. These parameters, or some selected therefrom, are stored with the profile, in order to obtain a complete description of the printing machine in the profiling condition.

If, for example, the behavior of the tonal value gain with respect to different paper roughness under otherwise identical conditions is known, various, not too severely different paper grades can be handled with one profile (i.e., by the profile to be used being derived from this via the known laws). According to the prior art, this is done in a form in which the same profile is used for similar paper grades, and the residual deviation is balanced out by the machine actuating elements. The present invention avoids the necessity for such correction.

On the basis of the profile pool 6, a print job is now handled as follows: The digital data 2 of a print job (i.e., postscript) are passed to the data processing device 3, which is intended to prepare the data for the printing machine 1. In general, this is the RIP (Raster Image Processor), which converts the data 2, which up to this point has not been prepared in a machine-specific way, for setting the image on the printing plate. In offset, this is binary data which designates the occupied and unoccupied areas (pixels) of the printing plate.

Before the inter image process begins, the RIP 3 calls up the machine parameters which are to prevail at the time of the printing process, that is to say communication takes place between RIP 3 and printing machine 1. In printing machine 1, these machine parameters can be derived, for example, from the current parameters.

In concrete terms, the machine condition is monitored continuously by means of suitable measuring sensors. Such sensors (densitometers, color measuring instruments on line and off line) are commercially available. The trend over the printing time is determined. If, for example, the temperature increases slowly, the viscosity of the printing ink slowly becomes lower, and the tonal value gain changes accordingly. This change can be determined, together with the rate of change, using statistical methods. If the RIP then calls up the next profile, an estimate relating to the start of printing of the print job called up will be carried out via the known output level of the current job, the status of the job (how far the job has already been processed) and the printing speed of the machine. Using the measured machine status and the trend analysis, it is then possible to extrapolate the condition of the machine at the time the print job is called up.

The current machine parameters are assumed to be known, and can be kept constant by mechanical or control methods or can be determined on line or off line. For a job which is currently being printed, a profile (20) (FIG. 3) was selected which assumes a machine parameter set, namely that which was current at the time the profile was drawn up and which is deposited with the color profile.

Ideally, the parameters coincide with those of the desired machine condition. If no further influencing factors are known, it can then be assumed that this desired machine condition also applies for the following print job, and the profile can be applied directly for the external parameter set of the print job.

Figure 3:
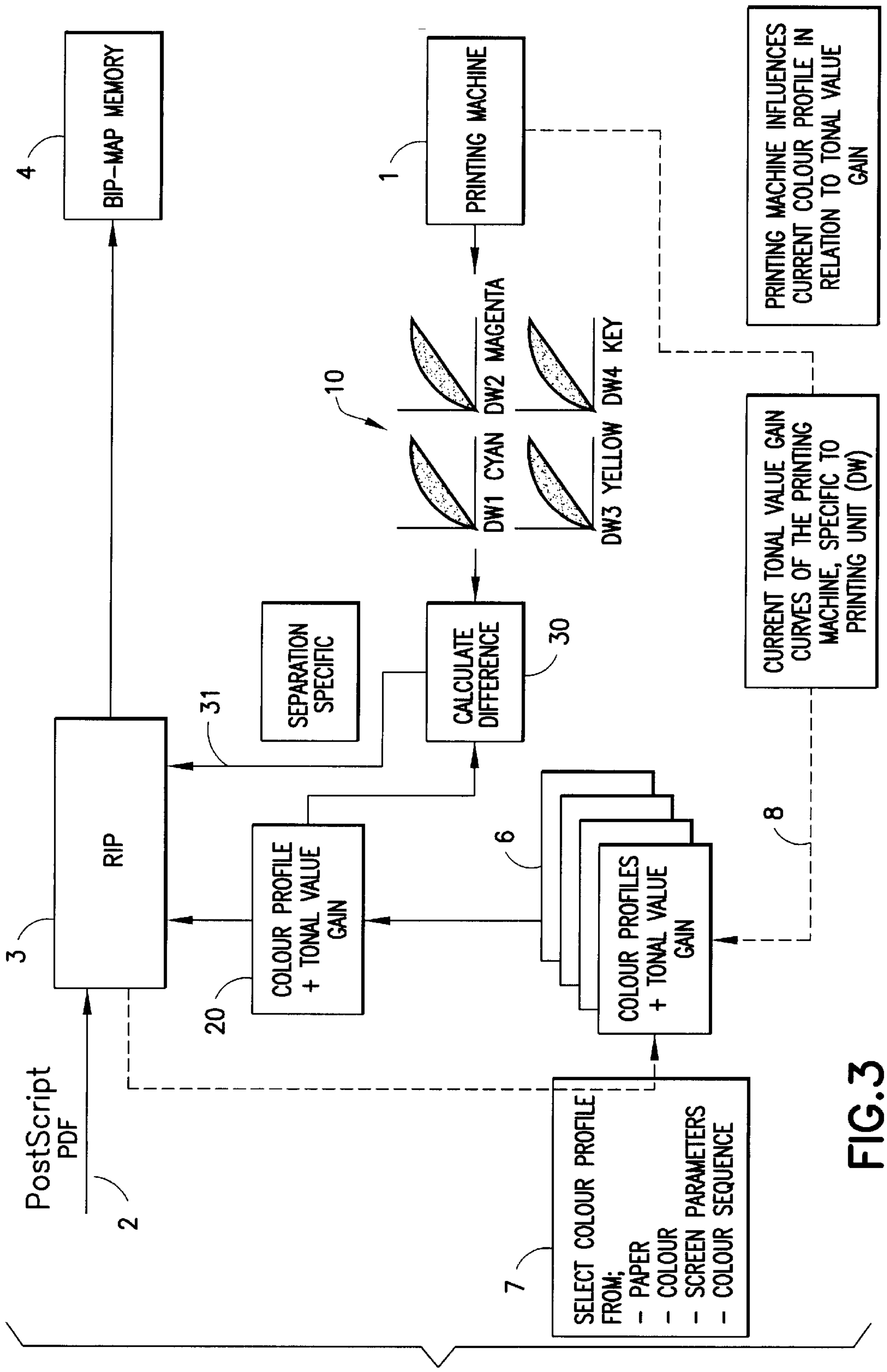
FIG. 3 is a block diagram of a third exemplary embodiment, which indicates a further variation of the sequence according to FIG. 1.

If there is any difference from the desired condition, the profile for the print job to be prepared must be adapted 30. The preferred option here uses a combination of (four-dimensional) color profile and one-dimensional correction curves 10 (FIG. 3).

The application of color profile 20 for the conversion from the operating color space of the pre-press stage to the target color space of the printing machine is always a multi-dimensional transformation, usually, from RGB to CMYK. Transformations from a three-dimensional to a four-dimensional space, from a standard color space, such as Lab to CMYK, from a three-dimensional in or the case of a CMYK to CMYK conversion, from one four-dimensional space into another. This conversion is often followed, as possible, for example, in the case of ICC profiles, by a one-dimensional transformation of the individual color area coverages.

The adaptation of the multi-dimensional transformation of such a profile to current machine parameters is complex. It is simpler to leave the multi-dimensional transformation unchanged and, in a second step, to carry out the correction of the deviations of the current machine profile to the color profile, but only one-dimensionally for the respective color or printing point.

For this purpose, each color the individual color characteristic curve assumed in the profile is balanced against the current characteristic curve 30, and a one-dimensional correction characteristic curve is formed, which corrects the image data after the multi-dimensional color-space transformation that the difference between the assumed and current characteristic curve is compensated for 31 for each tonal value. This correction characteristic curve can be balanced against the one-dimensional individual color characteristic curves, in order that a twofold transformation is avoided (FIG. 3). The modified one-dimensional transformations can then be deposited in a modified profile, so that an adapted profile is produced. However, this adaptation is preferably carried out only for the respective print job and hence the number of profiles to be managed is kept small.

The correction characteristic curve from the deviation of the current machine condition from the desired machine condition is determined to a first approximation during the job being printed, and is then used for the compensation of the following job, even if the latter has different printing characteristic curves, for example because of the use of a different paper. If the color profile used permits only a multi-dimensional transformation, one-dimensional transformations have to follow for each color, and are given directly by the correction characteristic curve.

The RIP 3 process then receives, in response to its request, the color profile 20 to be used, which is selected from the profile pool 6, and, the linear correction characteristic curves 10 to be applied, or the already appropriately adapted profile. It carries out the transformation and data preparation and passes on the data to the image-setting system. The image data is therefore optimally adapted to the current machine condition and the external parameter combination to be printed, and permits a print which agrees exactly, to the maximum extent, with the target stipulations.

An advantageous embodiment of the invention resides in the introduction of threshold values for checking the quality of the profile used. The parameter set of the selected profile may differ from the current parameter set, and will also do so in the normal case. It is then possible to introduce threshold values for the deviations, below which, the quality to be achieved is achieved without any restriction during the use of the profile. Some examples are a deviation of the previously maintained tonal value curve from the actual curve by less than 2% for quality demands which are not excessively high, the use of paper with a somewhat changed absorption behavior, and the use of paper with a somewhat changed color locus.

The threshold values may be quality-dependent and job-dependent, —i.e., for very high demands on quality, and than for only moderate demands on quality, they are lower for critical subjects they are lower than for non-critical subjects. Critical is to be understood here in the sense of difficult for the machine to reproduce, which can be judged with relative ease by those skilled in the art.

Figure 2:
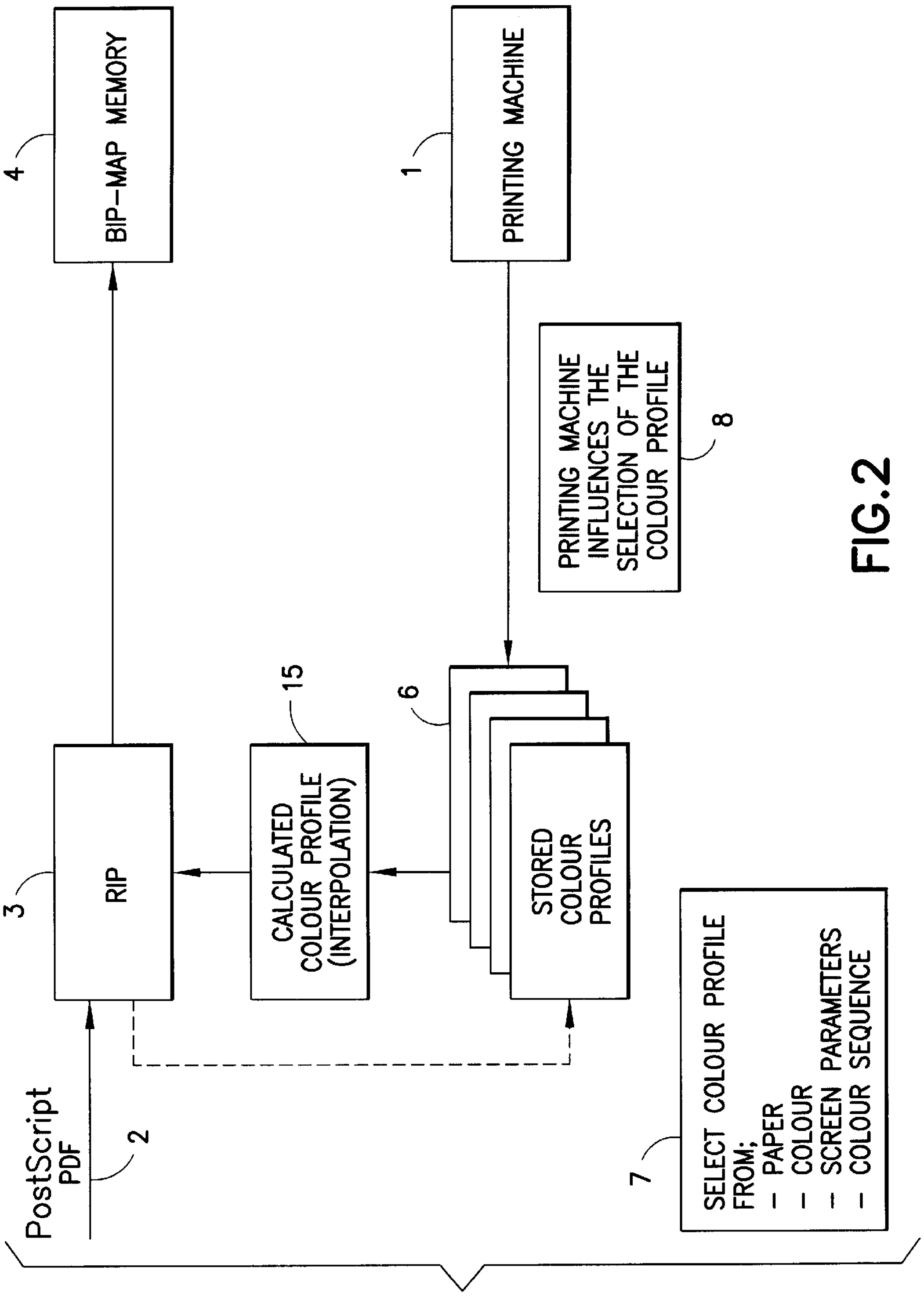
FIG. 2 is a block diagram of a further exemplary embodiment, which indicates a variant of the sequence according to FIG. 1.

If the deviation reaches the threshold value, then, firstly, linear compensation can be used (as according to FIG. 3), and secondly, a profile interpolation can be used in order to produce a profile adapted to the machine condition (as according to FIG. 2). As described above, this profile may be adapted only linearly or may have experienced a true multi-dimensional adaptation.

Referring to FIG. 2, at the time at which the data is prepared for image setting, the machine condition forecast for the time of printing is called up 8. The machine condition forecast, together with the knowledge of the operating materials 7, that machine profile which most closely approaches that of the print job from a pool 6 of stored profiles, and a profile 15 is interpolated from this and is used for the data preparation by RIP 3.

If an sufficiently adequate interpolation is not possible, or if the deviations are greater than a further threshold value, the operator is warned. He is shown the handling alternatives available to him—e.g., use the closest profile nonetheless, use other operating materials, change machine conditions, reprofile etc.—and is asked for a decision.

An analogous procedure, but without the possibility of adapting the data, applies to checking the machine conditions at the time of printing. If deviations from the current data preparation are determined which are greater than predefined threshold values, a color alarm is displayed to the operator. The thresholds can again be quality-dependent and job-dependent. Again, alternatives are shown to the operator—e.g., use other operating materials, change machine conditions, set the image again with a different profile or create a new profile—and he is asked for a decision.

A further preferred embodiment (according to FIG. 4) of the invention is directed towards modularizing the digital printing machine 1. The RIP 3 is nowadays the limit of the work flow of the pre-press stage. In a digital printing machine 1, the control system of the machine itself also has its own data processing capabilities. In a modem work flow, operations are now carried out with so-called job tickets 50, 51, which contain meta information (e.g., information about image data, further processing information, job administration information, job name, job information, and so on) about a print job and can therefore influence, for example, the type of RIP 3, the scanning parameters and the like. Within the context of the use of job tickets 50, 51, communication between RIP 3 and printing-machine control system can also take place, in that the printing machine changes the job ticket of a job and the RIP 3 then requests a job ticket 51 and receives it from the printing-machine control system. All the necessary information for the RIP process, including the one-dimensional and multi-dimensional color profile, are then contained in the job ticket and are applied to the job described on the job ticket. Communication in the reverse direction, that is to say from RIP 3 to the printing machine 1 via a job ticket 50 is equally possible.

Figure 5:
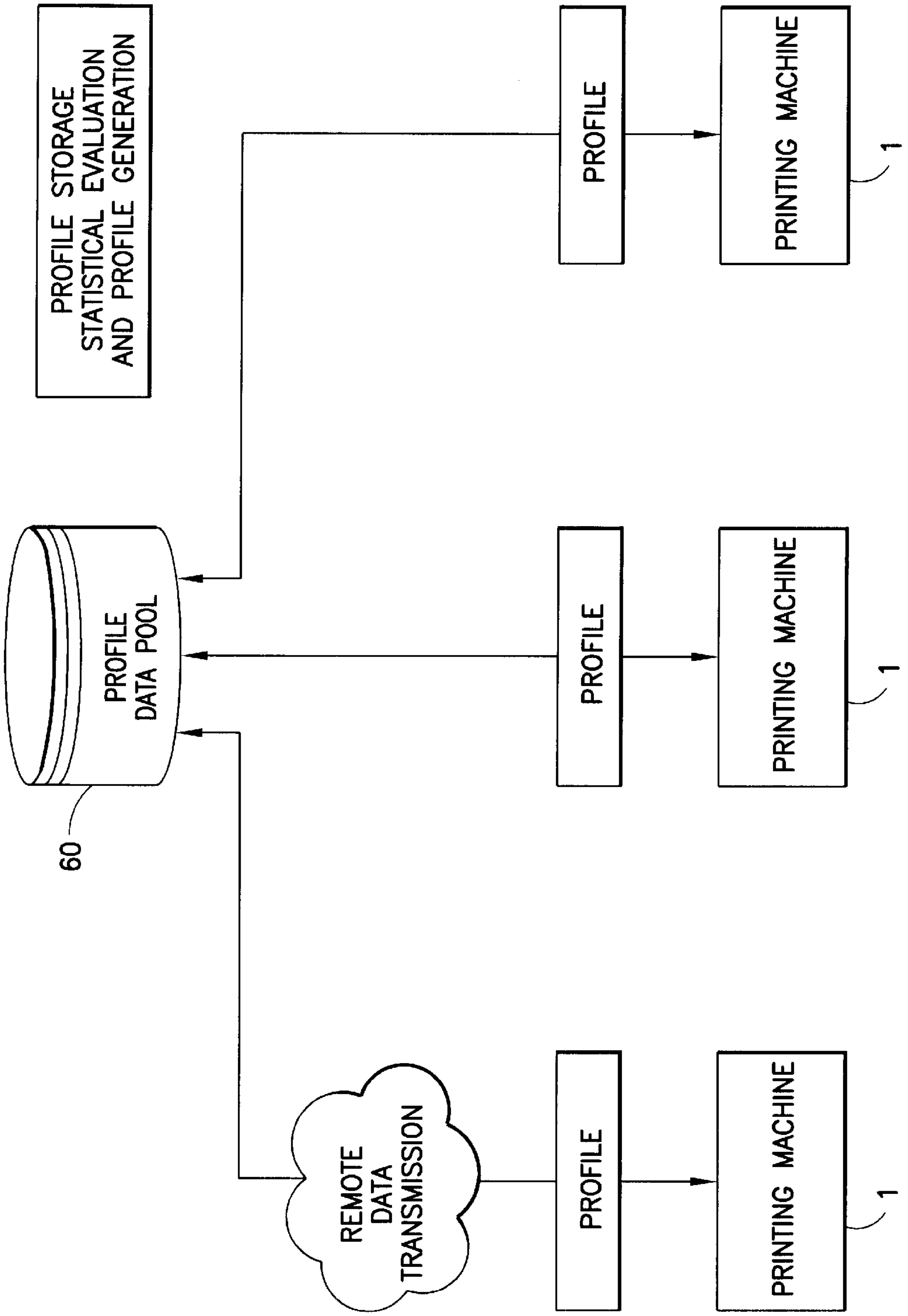
FIG. 5 is a schematic picture of a profile data pool.

Referring to FIG. 5, in order to obtain the largest possible profile pool 60, use can be made of the fact that a digital machine 1 is linked directly to the data network. As a result, the profile pool 60 can be made mutually accessible to a number of digital printing machines of this type. If, for example, a central data pool 60 is created, each machine 1 can access this data pool worldwide over the Internet, for example, via gateways or routers, and can fetch and deposit profiles there.

Using the information relating to the machine profile and the operating materials, the profiles can be compared and, at least if there is sufficient similarity, can be used or converted.

The similarity of two profiles can be determined in the following way, for example. Each profile is characterized by a number of external and internal parameters. Each of these parameters is then weighted with the significance of its influence on the profile. This weighting may also be adaptable to different printing conditions, such as for use in packaging or for use in gravure printing or for use in newspaper production. A sum value is then formed from the magnitudes of the differences between the values of the individual parameters in profile A and the values of the parameters in the profile B, multiplied by the weighting of the respective parameter. The resulting sum, which is always positive, is smaller the more similar the parameter sets of the profiles are, and zero in the case of exactly identical printing conditions. The determination of the similarity may also be carried out via fuzzy logic or neural networks or, respectively, a combination of the two. Using a method of this type, it is also possible to incorporate parameters which are difficult to get in exact numbers.

The invention is not limited by the embodiments described above which are presented as examples only but can be modified in various ways within the scope of protection defined by the appended patent claims.

We claim:

1. A method for profiling and calibrating a digitally controllable printing machine having a permanent printing plate comprising the steps of:

creating image data in a machine-independent format in a pre-press stage;

forecasting a machine condition expected at the time of a printing process using at least one of machine parameters derived from characteristic curves and current machine parameters;

providing a profile pool including color profiles which characterize a reproduction process for specific settings, wherein each calculated color profile is associated with data pertaining to external parameters of that profile;

determining a color profile most closely related to a current print job using the machine condition forecast information and information relating to operating materials of the printing machine and selecting the color profile from the profile pool;

preparing the image data based on the determined color profile by a data processing device;

feeding the image data in adapted form into an image-setting unit of the printing machine;

checking the current machine condition immediately before printing;

comparing the current machine condition to the forecast machine condition; and warning the operator when said step of comparing exceeds a predefinable threshold.

2. The method set forth in claim 1, wherein said step of determining further comprises correcting residual deviations in the image data using one-dimensional corrections tables for each color separation.

3. The method set forth in claim 2, wherein said color profile comprises characteristic curves of individual colors.

4. The method set forth in claim 1, wherein the color profile is associated with generic characteristics of the printing machine, wherein the generic characteristics comprise at least one of individual printing-unit characteristic curves, color sequence and ink acceptance behavior.

5. The method set forth in claim 1, wherein said color profile comprises an ICC profile.

6. The method set forth in claim 2, wherein said one-dimensional correction corrects a tonal value gain of the color profile to a forecast tonal value gain.

7. The method set forth in claim 2, wherein said one-dimensional correction corrects a density characteristic curve from that taken into account in the color profile to a forecast density characteristic curve.

8. A method for profiling and calibrating a digitally controllable printing machine having a permanent printing plate comprising the steps of:

creating image data in a machine-independent format in a pre-press stage;

forecasting a machine condition expected at the time of a printing process using at least one of machine parameters derived from characteristic curves and current machine parameters;

providing a profile pool including color profiles which characterize a reproduction process for specific settings, wherein each calculated color profile is associated with data pertaining to external parameters of that profile;

determining a color profile most closely related to a current print job using the machine condition forecast information and information relating to operating materials of the printing machine and selecting the color profile from the profile pool;

preparing the image data based on the determined color profile by a data processing device;

feeding the image data in adapted form into an image-setting unit of the printing machine;

triggering an alarm when no suitable color profile is determined; and prompting an operator to input instructions.

9. A method for profiling and calibrating a digitally controllable printing machine having a permanent printing plate comprising the steps of:

creating image data in a machine-independent format in a pre-press stage;

forecasting a machine condition expected at the time of a printing process using at least one of machine parameters derived from characteristic curves and current machine parameters;

providing a profile pool including color profiles which characterize a reproduction process for specific settings, wherein each calculated color profile is associated with data pertaining to external parameters of that profile;

determining a color profile most closely related to a current print job using the machine condition forecast information and information relating to operating materials of the printing machine and selecting the color profile from the profile pool;

preparing the image data based on the determined color profile by a data processing device;

feeding the image data in adapted form into an image-setting unit of the printing machine; and triggering an alarm when no color profile having a correction combination of operation media to be used is found.

10. The method set forth in claim 8, further comprising comparing a difference between the determined color profiles and a machine condition with a predefinable threshold value, wherein said step of triggering an alarm is performed when the difference exceeds the threshold value.

11. The method set forth in claim 1, wherein the machine condition forecast comprises a current machine condition.

12. The method set forth in claim 1, wherein the machine condition forecast is obtained by extrapolating it from a current machine condition.

13. The method set forth in claim 11, further comprising calculating the current machine condition from data which originates from sensors within the machine in conjunction with knowledge of the machine characteristics.

14. The method set forth in claim 12, further comprising calculating the current machine condition from data which originates from sensors within the machine in conjunction with knowledge of the machine characteristics.

15. The method set forth in claim 1, wherein the permanent printing plate has its image set within the printing machine.

16. The method set forth in claim 1, further comprising setting within the printing machine the image on the printing plate.

17. The method set forth in claim 1, further comprising setting outside the printing machine the images on the printing plate, and providing a direct data link between printing-plate image setting and the printing machine.

18. The method set forth in claim 1, further comprising the steps of:

depositing a plurality of profiles in a data pool;

enabling access to the data pool by a plurality of digital printing machines, said access being performed when no suitable profile is available on site; and depositing newly created profiles in the data pool to obtain the largest possible profile pool.

19. The method set forth in claim 18, wherein said access is enabled over the Internet.

20. The method set forth in claim 1, wherein said predefinable threshold depends on one of a predefined printing quality and type of print job.

21. A method for profiling and calibrating a digitally controllable printing machine having a permanent printing plate comprising the steps of:

creating image data in a machine-independent format in a pre-press stage;

forecasting a machine condition expected at the time of a printing process using at least one of machine parameters derived from characteristic curves and current machine parameters;

providing a profile pool including color profiles which characterize a reproduction process for specific settings, wherein each calculated color profile is associated with data pertaining to external parameters of that profile;

determining a color profile most closely related to a current print job using the machine condition forecast information and information relating to operating materials of the printing machine and selecting the color profile from the profile pool;

preparing the image data based on the determined color profile by a data processing device;

feeding the image data in adapted form into an imagesetting unit of the printing machine; and establishing communication between a raster image processor and the printing machine using job tickets.

22. The method set forth in claim 21, wherein said color profile data comprises a job-ticket structure which comprises color profiles and profiles of external parameters.

23. A method for profiling and calibrating a digitally controllable printing machine having a permanent printing plate comprising the steps of:

creating image data in a machine-independent format in a pre-press stage;

forecasting a machine condition expected at the time of a printing process using at least one of machine parameters derived from characteristic curves and current machine parameters;

providing a profile pool including color profiles which characterize a reproduction process for specific settings, wherein each calculated color profile is associated with data pertaining to external parameters of that profile;

determining a color profile most closely related to a current print job using the machine condition forecast information and information relating to operating materials of the printing machine and selecting the color profile from the profile pool;

preparing the image data based on the determined color profile by a data processing device;

feeding the image data in adapted form into an imagesetting unit of the printing machine; and determining similarities between two profiles, said determining comprising the steps of: weighting each parameter of a profile with a significance of influence; forming a sum value from magnitudes of differences between the values of relevant parameters of the first and second profiles; and multiplying the differences by the weighting of the respective parameter.

* * * * *